United States Patent
de la Cropte de Chanterac et al.

(10) Patent No.: US 9,811,142 B2
(45) Date of Patent: Nov. 7, 2017

(54) LOW ENERGY PROCESSOR FOR CONTROLLING OPERATING STATES OF A COMPUTER SYSTEM

(71) Applicant: Apple Inc., Cupertino, CA (US)

(72) Inventors: Cyril de la Cropte de Chanterac, San Francisco, CA (US); Manu Gulati, Saratoga, CA (US); Erik P. Machnicki, San Jose, CA (US); Keith Cox, Sunnyvale, CA (US); Timothy J. Millet, Mountain View, CA (US)

(73) Assignee: Apple Inc., Cupertino, CA (US)

(*) Notice: Subject to any disclaimer, the term of this patent is extended or adjusted under 35 U.S.C. 154(b) by 172 days.

(21) Appl. No.: 14/499,807

(22) Filed: Sep. 29, 2014

(65) Prior Publication Data

US 2016/0091954 A1    Mar. 31, 2016

(51) Int. Cl.
*G06F 1/32* (2006.01)

(52) U.S. Cl.
CPC ............ *G06F 1/3234* (2013.01); *G06F 1/324* (2013.01); *G06F 1/3206* (2013.01); *G06F 1/3243* (2013.01); *G06F 1/3296* (2013.01); *G06F 1/3203* (2013.01); *Y02B 60/1217* (2013.01); *Y02B 60/1239* (2013.01); *Y02B 60/1285* (2013.01)

(58) Field of Classification Search
CPC ....... G06F 1/324; G06F 1/3206; G06F 1/3234
USPC ........................................................ 713/322
See application file for complete search history.

(56) References Cited

U.S. PATENT DOCUMENTS

| | | | |
|---|---|---|---|
| 6,345,362 B1* | 2/2002 | Bertin | G06F 9/3867 712/E9.049 |
| 6,594,771 B1* | 7/2003 | Koerber | G06F 1/26 713/330 |
| 7,679,214 B2 | 3/2010 | Nakamura | |
| 7,908,493 B2 | 3/2011 | Bieswanger et al. | |
| 7,945,885 B2 | 5/2011 | Hoberman et al. | |
| 8,793,512 B2 | 7/2014 | Branover et al. | |
| 9,285,858 B2* | 3/2016 | Klassen | G06F 1/3206 |
| 2003/0122429 A1* | 7/2003 | Zhang | G06F 1/26 307/43 |
| 2005/0096102 A1* | 5/2005 | Mock | H04W 52/265 455/574 |
| 2006/0069936 A1* | 3/2006 | Lint | G06F 1/3203 713/320 |

(Continued)

OTHER PUBLICATIONS

International Search Report and Written Opinion in application No. PCT/US2015/045585 dated Oct. 9, 2015.

(Continued)

*Primary Examiner* — Jaweed A Abbaszadeh
*Assistant Examiner* — Volvick Derose
(74) *Attorney, Agent, or Firm* — Meyertons, Hood, Kivlin, Kowert & Goetzel, P.C.

(57) ABSTRACT

Embodiments of a method that allow the adjustment of performance settings of a computing system are disclosed. One or more functional units may include multiple monitor circuits, each of which may be configured to monitor a given operational parameter of a corresponding functional unit. Upon detection of an event related to a monitored operational parameter, a monitor circuit may generate an interrupt. In response to the interrupt a processor may adjust one or more performance settings of the computing system.

16 Claims, 5 Drawing Sheets

(56) References Cited

U.S. PATENT DOCUMENTS

| | | | |
|---|---|---|---|
| 2006/0156042 A1* | 7/2006 | Desai | G06F 1/28 713/300 |
| 2006/0218424 A1* | 9/2006 | Abramovici | G06F 1/3203 713/323 |
| 2007/0028130 A1* | 2/2007 | Schumacher | G06F 1/3215 713/320 |
| 2007/0106914 A1* | 5/2007 | Muthukumar | G06F 1/3203 713/300 |
| 2007/0198863 A1* | 8/2007 | Bose | G06F 1/206 713/300 |
| 2008/0022140 A1 | 1/2008 | Yamada et al. | |
| 2009/0240959 A1* | 9/2009 | Conroy | G06F 1/3203 713/300 |
| 2009/0259869 A1* | 10/2009 | Naffziger | G06F 1/26 713/340 |
| 2010/0268930 A1 | 10/2010 | Bose | |
| 2011/0093733 A1* | 4/2011 | Kruglick | G06F 1/3203 713/340 |
| 2011/0173360 A1* | 7/2011 | Thomson | G06F 1/3203 710/260 |
| 2011/0301889 A1* | 12/2011 | Naffziger | G06F 1/206 702/62 |
| 2012/0066535 A1* | 3/2012 | Naffziger | G06F 1/206 713/340 |
| 2012/0075005 A1* | 3/2012 | Flores | H03K 19/0016 327/512 |
| 2012/0079299 A1* | 3/2012 | Cepulis | G06F 1/183 713/320 |
| 2012/0079302 A1* | 3/2012 | Ise | G06F 1/3209 713/323 |
| 2012/0102344 A1* | 4/2012 | Kocev | G06F 1/3237 713/322 |
| 2012/0133352 A1* | 5/2012 | Frank | G06F 1/324 323/318 |
| 2012/0159216 A1* | 6/2012 | Wells | G06F 1/26 713/322 |
| 2012/0191956 A1 | 7/2012 | Fleischman | |
| 2013/0155081 A1* | 6/2013 | Khodorkovsky | G06F 1/3206 345/522 |
| 2013/0159750 A1* | 6/2013 | Branover | G06F 1/3206 713/323 |
| 2013/0212417 A1* | 8/2013 | Frid | G06F 1/3203 713/323 |
| 2014/0032951 A1* | 1/2014 | Garg | H04W 52/0219 713/323 |
| 2014/0089708 A1* | 3/2014 | Menard | G06F 1/3234 713/323 |
| 2014/0108841 A1* | 4/2014 | Tomi | G06F 1/206 713/323 |
| 2014/0167840 A1* | 6/2014 | Machnicki | G05B 11/01 327/544 |
| 2014/0237276 A1* | 8/2014 | Machnicki | G06F 1/3234 713/323 |
| 2014/0258744 A1* | 9/2014 | Meyer | G06F 1/3203 713/320 |
| 2015/0006917 A1* | 1/2015 | Rash | G06F 1/26 713/300 |
| 2015/0355705 A1* | 12/2015 | Weissmann | G06F 1/324 713/322 |

OTHER PUBLICATIONS

Jukka Eskelinen et al: "Optimizing microcontroller power efficiency for ultra-low-power designs—Embedded Computing Design", Feb. 26, 2010; XP055217804, Retrieved from the internet: http://embedded-computing.com/articles/optimizing-power-efficiency-ultralow-power-designs/ [retrieved on Oct. 1, 2015] p. 4, section "More power saving techniques".

International Preliminary Report in application No. PCT/US2015/045585 dated Apr. 13, 2017.

Allowance and Search Report in ROC (Taiwan) Pat. Appln. No. 104128213 dated May 27, 2016.

* cited by examiner

LOW ENERGY PROCESSOR FOR CONTROLLING OPERATING STATES OF A COMPUTER SYSTEM

BACKGROUND

Technical Field

Embodiments described herein relate to computing systems, and more particularly, to techniques adjusting performance settings for functional units within the computing system.

Description of the Related Art

Computing systems may include one or more systems-on-a-chip (SoC), which may integrate a number of different functions, such as, e.g., graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Within an SoC, different regions or functional units may operate at different clock frequencies (functional blocks operating at different clock frequencies are commonly referred to as being in different "clock domains"). For example, functional units coupled to external interfaces may operate at a clock frequency commensurate with the needs of such external interfaces, while other functional units may be designed to function at a highest clock frequency possible for a given semiconductor manufacturing process. Other functional units may include logic circuits operating at different clock frequencies, while some functional units may also allow for varying clock frequencies over time dependent upon work load.

Additionally, within an SoC, different regions or functional units may employ different internal power supplies, each of which may be at a different voltage level. For example, certain analog and Input/Output (I/O) circuits may require voltage levels higher than other digital circuit units. The SoC may include circuits, such as voltage regulators, e.g., configured to generate the internal power supplies.

During operation, voltage levels of the internal power supplies may be adjusted dependent upon performance or power requirements. For example, during periods of reduced activity within the SoC, voltage levels of one or more of the internal power supplies may be reduced to inactive portions of the SoC to reduce leakage power consumption. Alternatively or additionally, frequencies of internal clock signals may also be adjusted.

SUMMARY OF THE EMBODIMENTS

Various embodiments of a method and apparatus for tuning delay in a circuit path are disclosed. Broadly speaking, an apparatus and a method are contemplated in which, a system includes one or more functional units. At least one functional unit includes a monitor circuit that is configured to monitor an operational parameter associated with its corresponding functional unit. The monitor circuit is further configured to send data indicative of the operational parameter to a power manager processor. The power manager processor may be configured to receive the data, and adjust one or more performance settings dependent upon the received data.

In one embodiment, the power manager processor may be configured to exit a low power mode. The power manager processor may exit the low power mode after a first time period has elapsed since the power manager processor entered the low power mode.

In a further embodiment, each monitor circuit may be further configured generate an interrupt. The power manager processor may be further configured to exit the low power mode responsive to the interrupt.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

In computing systems, the execution of different applications may result in different levels of activity for various functional units within the computing system. For example, for various video related applications, a Graphics Processing Unit (GPU) and its associated memory may have a high level of activity, while other functional units, such as, e.g., an Input/Output (I/O) unit may have minimal activity. In such cases, the performance of the active components of the computing system may be adjusted to provide additional processing speed or the like. Such adjustments may involve increasing or decreasing a voltage level of a power supply to active functional units. In some cases, a change in a frequency of a clock signal may accompany, or be in lieu of, the changes in the voltage level of the power supply.

Adjustments to the performance of a functional unit within a computing system may be based on events within the functional unit, such as changes in temperature, a level of activity within the functional unit, or any other suitable metric. A main processor or CPU may, as instructed by an operating system, track such events, and adjust system performance accordingly. However, the main processor may have other tasks to handle, resulting in a lag to respond to the aforementioned events, as well as the power consumed in switching processing contexts to respond to the event. The embodiments illustrated in the drawings and described below may provide techniques for quickly adjusting performance settings within a computing system while limiting additional power consumption.

Figure 1:
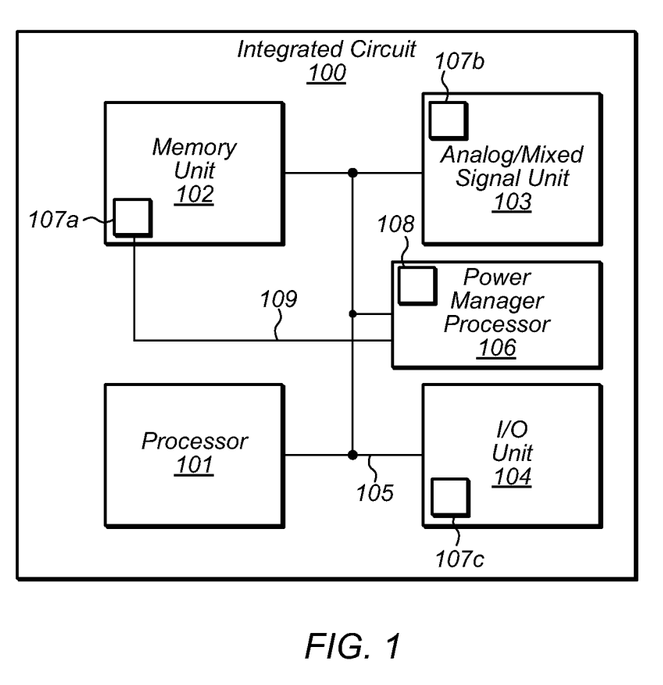
FIG. 1 illustrates an embodiment of an integrated circuit.

A block diagram of an integrated circuit is illustrated in FIG. 1. In the illustrated embodiment, the integrated circuit 100 includes a processor 101 coupled to memory unit 102, and analog/mixed-signal unit 103, and I/O block 104 through internal bus 105 (also referred to herein as a "switch fabric"). Integrated circuit 100 also includes power manager processor 106, memory unit 102, and monitor circuits 107a-c. In various embodiments, integrated circuit 100 may be configured for use in a desktop computer, server, or in a mobile computing application such as, e.g., a tablet or laptop computer.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may execute program instructions, which may be stored in memory unit 102 to perform various computational tasks. Processor 101 may, in some embodiments, perform primary computation tasks, such as, e.g., executing operating system instructions, for integrated circuit 100.

Memory unit 102 may include any suitable type of memory such as a Dynamic Random Access Memory (DRAM), a Static Random Access Memory (SRAM), a Read-only Memory (ROM), Electrically Erasable Programmable Read-only Memory (EEPROM), or a FLASH memory, for example. It is noted that in the embodiment of an integrated circuit illustrated in FIG. 1, a single memory unit is depicted. In other embodiments, any suitable number of memory blocks may be employed.

Memory unit 102 may include various circuit blocks such as decoders, data storage cells, and the like. Memory unit 102 may also include monitor circuit 107a. In various embodiments, monitor circuit 107 may be configured to monitor or track an operating parameter associated with memory unit 102. For example, monitor circuit 107a may track a temperature of integrated circuit 100 at a location near memory unit 102. Monitor circuit 107a may, in other embodiments, include counters or other suitable state machines capable of tracking accesses to and responses from memory unit 102. In some embodiments, monitor circuit 107a may be configured to detect an event, i.e., a specific condition related to the monitor operational parameter, and, in response to the event, generate an interrupt for power manager processor 106. Monitor circuit 107a may also be configured to store data related to the monitored operational parameter, and send the data to power manager processor 106. It is noted that although a single monitor circuit is illustrated in FIG. 1, in other embodiments any suitable number of monitor circuits may be employed.

Monitor circuits, such as those described herein, may also be configured to enter a power down or reduced power state dependent upon operating conditions with a computing system. In some embodiments, an operational state of one monitor circuit may depend on data received from one or more other monitor circuits. For example, a monitor circuit configured to detect variations in a voltage level of a power supply may be disabled for certain temperature ranges as measured by another monitor circuit. In various embodiments, a power manager processor, such as is described below in regard to FIG. 2, may control an operational state of multiple monitor circuits.

Analog/mixed-signal unit 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal unit 103 may be configured to perform power management tasks with the inclusion of on-chip power supplies and voltage regulators. Analog/mixed-signal block 103 may also include, in some embodiments, radio frequency (RF) circuits that may be configured for operation with wireless networks. Analog/mixed signal unit 103 may also include monitor circuit 107b which may include some or all of the functionality described above in regard to monitor circuit 107a.

I/O unit 104 may be configured to coordinate data transfer between integrated circuit 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol. I/O unit 104 may also include monitor circuit 107c which may include some or all of the functionality described above in regard to monitor circuit 107a.

I/O block 104 may also be configured to coordinate data transfer between integrated circuit 100 and one or more devices (e.g., other computer systems or integrated circuits) coupled to integrated circuit 100 via a network. In one embodiment, I/O unit 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O unit 104 may be configured to implement multiple discrete network interface ports.

Power manager processor 106 may, in various embodiments, be representative of a general-purpose processor that performs computational operations. For example, power manager processor 106 may be a microprocessor, a microcontroller, an application-specific integrated circuit (ASIC), or a field-programmable gate array (FPGA), or any suitable processing engine. As described below, in more detail in regard to FIG. 2, power manager processor 106 may include a dedicated memory. Program instructions included in one or more control loops for execution by power manager processor 106 may be stored in the dedicated memory. By retrieving program instructions from the dedicated memory, power manager processor may, in various embodiments, be able to process interrupts with minimal latency, and not consume system resources being used by an operating system or other software applications.

In some embodiments, power manager processor 106 may include interrupt interface 108 configured to receive interrupts from one or more monitor circuits, such as, monitor circuits 107*a-c*, for example. Interrupt interface 108 may remain active during periods when other portions of power manager processor 106 are in a low power mode. Upon receiving an interrupt, power manager processor may exit the low power mode in order to execute the program instructions included in the control loops. In some embodiments, by employing a low power mode when not in use, the power manager processor may perform adjustments to performance settings of integrated circuit 100 with a minimal impact on overall power consumption of the integrated circuit.

Power manager processor 106 may, in some embodiments, receive data from a monitor circuit, such as, e.g., monitor circuit 107*a*, via communication bus 105. In some circumstances, however, using communication bus 105 for transmission of monitor circuit data may interfere with a measurement made by a monitor circuit. For example, a monitor circuit configured to measure activity on communication bus 105 and relay the measured activity via communication bus 105 would affect the measurement of bus activity by transmitting additional data via communication bus 105. In such cases, direct interface 109 may be employed to allow monitor circuit 107*a* to directly report measurement results to power manager processor 106.

It is noted that although power manager processor 106 is depicted as being part of integrated circuit 100, in other embodiments, power manager processor 106 may be included on a separate integrated circuit within a computing system. In some embodiments, power manager processor 106 may be physically located near, or included within a power manager unit (PMGR). The PMGR may be included in integrated circuit 100 or, in other embodiments, on a different integrated circuit. By locating power manager processor 106 near the PMGR, the overhead associated with accessing data, program instructions, and the like, stored in the PMGR.

Figure 2:
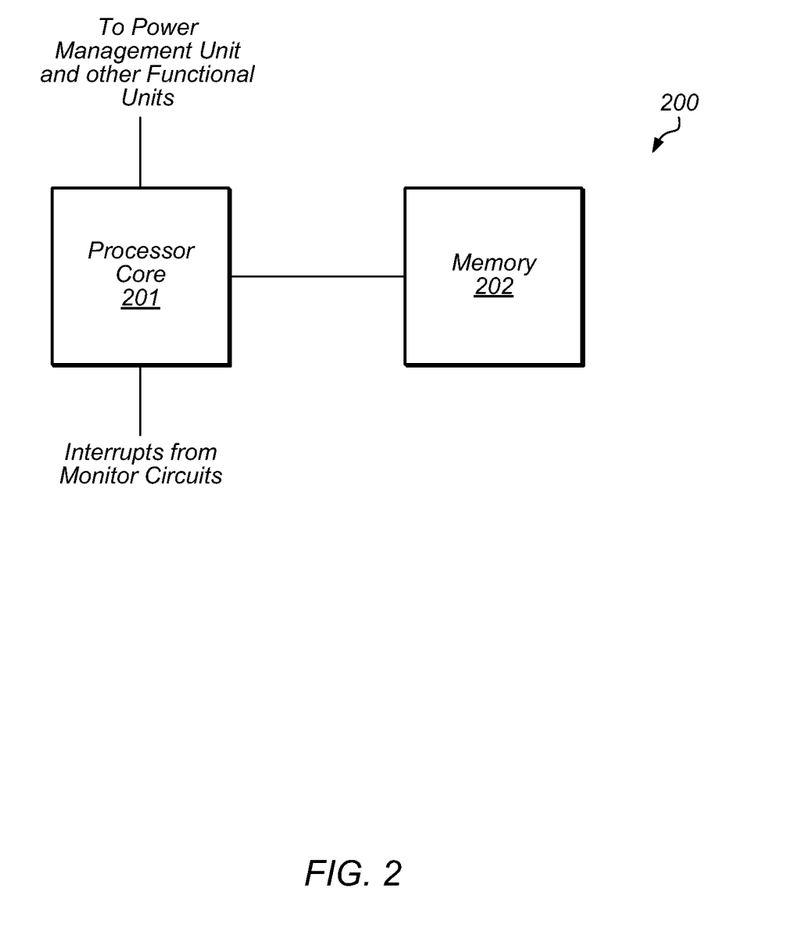
FIG. 2 illustrates an embodiment of a power manager processor.

Turning to FIG. 2, an embodiment of a power manager processor is illustrated. In the illustrated embodiment, power manager processor 200 includes processor core 201 coupled to memory 202. In various embodiments, power manager processor 200 may correspond to power manager processor 106 as illustrated in FIG. 1, and may be dedicated to handle interrupts in order to perform power management operations. Although only a single instance of a memory is depicted in the embodiment illustrated in FIG. 2, in other embodiments, any suitable number of memories may be employed.

In various embodiments, processor core 201 may be a general-purpose processor that executes program instructions. For example, processor core 201 may be a central processing unit (CPU) such as a microprocessor, a microcontroller, an application-specific integrated circuit (ASIC), or a field-programmable gate array (FPGA). Processor core 201 may, in various embodiments, be coupled to other functional units, such as, I/O block 104 as illustrated in FIG. 1 through an internal bus or other suitable communication network. In other embodiments, processor core may be coupled to functional units via a direct interface. For example, processor core 201 may be coupled to a power management unit (PMU) and clock generation circuitry by respective direct dedicated interfaces.

In some embodiments, only a small portion of processor core 201 may be active, and upon detection of an interrupt from a monitor circuit, all portions of processor core 201 may become active in order to execute program instructions. Processor core 201 may, in other embodiments, return to an active state at various times in order to monitor data received from different monitor circuits. For example, processor core 201 may become active every 10 ms to receive data from a monitor circuit configured to measure temperature, and then return to a low power state. In other embodiments, processor core 201 may include multiple timers (not shown), each configured to indicate the passage of various time periods for monitoring different events.

Memory 202 may, in various embodiments, include any suitable type of memory such as a Dynamic Random Access Memory (DRAM), a Static Random Access Memory (SRAM), or any other suitable memory type. In some embodiments, memory 202 may be coupled to a separate power supply than processor core 201. By employing a separate power supply for memory 202, data, such as, e.g., program instructions, may be retained in memory 202 even when power has been removed from processor core 201. Memory 202 may, in some embodiments, employ a retention mode, in which power is supplied to only the memory cells in memory 202 to maintain the stored data while reducing power consumption due to leakage in peripheral circuits of memory 202

During operation, processor core 201 may execute program instructions stored in memory 202. Such program instructions may include instructions to retrieve data (also referred to as "telemetry") from one or more monitor circuits, such as, monitor circuit 107 as illustrated in FIG. 1. It is noted, one or more monitor circuits may provide telemetry via an I/O interface, from another chip with in a computing system, such as, e.g., a Power Management Unit (PMU). The I/O interface may, in various embodiments, include any suitable interface, such as I2C, UART, and the like. The data may be retrieved at regular intervals, or in response to receiving an interrupt from a given monitor circuit. In some embodiments, the retrieved data may be stored in memory 202 for further processing or analysis.

In various embodiments, the program instructions stored in memory 202 may also include instructions to track received data from one or more monitor circuits. The program instructions may, in some embodiments, include separate sets of instructions (also referred to as "loops" or "control loops") that may be repeatedly executed by processor core 201 to analyze data received from a given monitor circuit. Such loops may also include instructions that adjust various voltage and frequency settings (commonly referred to as "performance settings") that affect operational capability of a given functional unit within a computing system. For example, in reference to FIG. 1, a loop monitoring processor 101 may detect that the processor 101 has to repeatedly wait for memory 102. In such cases, processor core 201 may, in response to instructions included in the loop, send a signal to a power management and clock unit to increase a voltage of the power supply to the memory, or increase a frequency of a clock signal provided to memory 102, or both, thereby increasing the performance of memory 102.

Processor core 201 may, in some embodiments, monitor, using received telemetry, memory throughput, memory latency, and switch fabric activity. The aforementioned control loops may adjust a frequency or performance level of switch fabric or memory in order to reduce latency, increase memory throughput, or reduce contention within the switch fabric.

It is noted that the embodiment illustrated in FIG. 2 is merely an example. In other embodiments, the program instructions stored in memory 202 may be updated or changed in response to variations in operating mode, physical operating conditions of the system, and the like.

Figure 3:
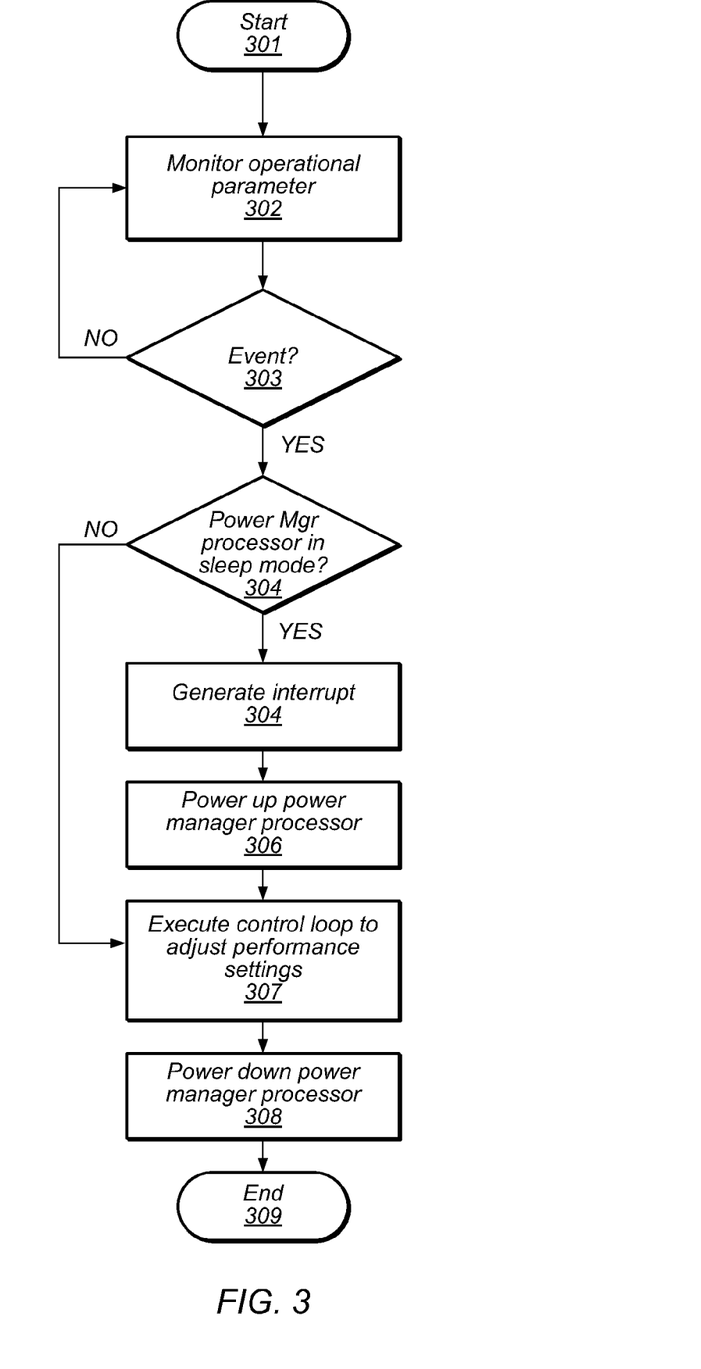
FIG. 3 illustrates a flow diagram depicting an embodiment of a method for adjusting performance settings of a computing system.

Turning to FIG. 3, a flow diagram depicting an embodiment of a method for adjusting performance of a system is illustrated. Referring collectively to FIG. 1 and the flow diagram of FIG. 3, the method begins in block 301.

Monitor circuit 107a may then monitor an operating parameter of memory unit 102 (block 302). In some embodiments, monitor circuit 107a may monitor a voltage level of a power supply, temperature, number of accesses to memory unit 102, or any other suitable metric. It is noted that although only a single monitor circuit is shown in FIG. 1, other embodiments may include multiple monitor circuit operating in parallel. Moreover, a functional unit may include multiple monitor circuits, each of which may be configured to monitor a different operating parameter within the functional unit. In some embodiments, multiple monitor circuits may be coupled to bus 105 to track different transactions or numbers of a specific transaction on bus 105.

The method may then depend on if an event occurs (block 303). Monitor circuit 107a may detect an event based on the monitoring of the operating parameter. For example, an event may, in some embodiments, include a change in temperature, operating voltage, or the like. Alternatively, the event may include a particular type of access to a functional unit, e.g., a write access, or when a number of accesses to the functional unit exceeds a predetermined value. In some embodiments, the event may include an access to the functional unit from another specific functional unit within a computing system, such as, integrated circuit 100, for example.

When no event is detected, monitor circuit 107a continues to monitor the operating parameter as described above in regards to block 302. If an event is detected, then the method may depend on the power state of power manager processor 106 (block 304). If power manager processor is in a power off or reduced power state, monitor circuit 107a may assert an interrupt (block 305). The interrupt may be sent to power manager processor 106 through bus 105. In other embodiments, monitor circuit 107a may have a direct connection (not shown) to power manager processor 106 allowing the interrupt to be sent directly to power manager processor 106. If power manager processor 106 is operating in an active mode, then the method may proceed as described below from block 307.

In response to the asserted interrupt, power manager processor 106 may exit from a low power (also referred to as a "sleep mode") and return to an active mode (block 306). While in the low power mode, a voltage level of a power supply to portions of power manager processor 106 may be at ground potential, thereby reducing leakage power consumption. Additionally, or alternatively, a clock signal to portions of power manager processor 106 may be stopped (commonly referred to as "clock gating"), thereby reducing dynamic power. While in the low power mode, a portion of power manager processor 106 may remain operational to detect the occurrence of interrupts or other system related events. Upon detection of an interrupt, the active portion of power manager processor 106 may re-activate the inactive portions of power manager processor 106, thereby allowing the resumption of processing activities. In various embodiments, by employing a low power mode for power manager processor 106, the power consumed to monitor system performance and adjust performance settings may be minimized.

Power manager processor 106 may then execute a control loop (block 307) to adjust performance settings. The control loop may be related to the event that trigger the interrupt, and may include one or more program instructions. Such program instructions may be stored in a memory dedicated to power manager processor 106, such as, e.g., memory 202 as illustrated in FIG. 2. Power manager processor 106 may retrieve the program instructions from the dedicated memory prior to execution. As described below in more detail in regard to FIG. 4, the program instructions may include instructions for retrieving data from a monitor circuit, performing an analysis of the retrieved data, and adjusting performance setting of the system, such as, e.g., a voltage level of a power supply, and/or a frequency of a clock signal of a given functional unit, dependent upon the results of the analysis. In some embodiments, the program instruction may include instructions for storing results of the analysis in the dedicated memory.

Once the control loop has completed, power manager processor 106 may then return to the low power state (block 308). It is noted that in some embodiments, power manager processor 106 may remain in active state. As described above, a clock signal to portions of power manager processor 106 may be gated, or a voltage level of a power supply coupled to portions of power manager processor 106 may be set to ground potential or any other suitable voltage level to reduce leakage power within power manager processor 106. A portion of power manager processor 106 related to interrupt handling may, in various embodiments, remain in an active state. In some embodiments, a last instruction in the control loop may signal power manager processor 106 to enter the low power mode. Once power manager processor 106 has entered the low power mode, the method may conclude in block 309.

It is noted that the embodiment of the method illustrated in FIG. 3 is merely an example. In other embodiments, different operations and different orders of operation are possible and contemplated.

Figure 4:
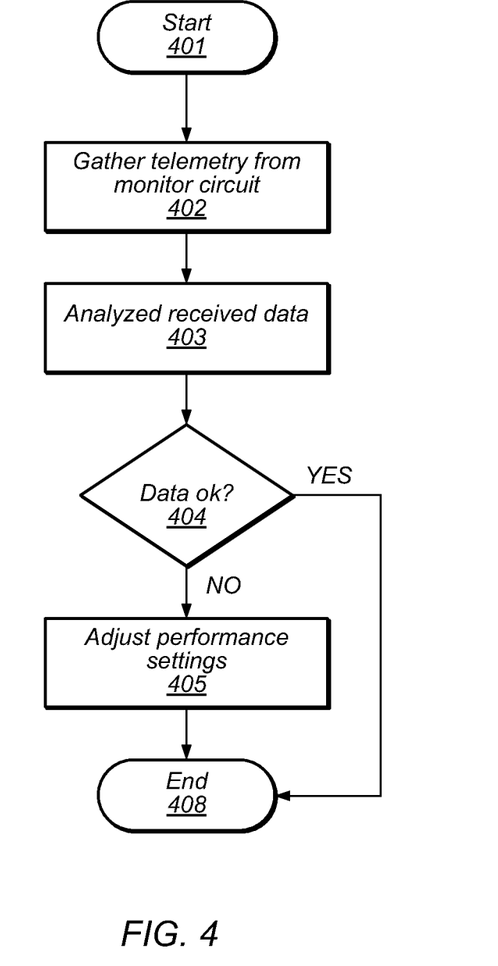
FIG. 4 illustrates a flow diagram depicting an embodiment of a method for operating a power manager processor executing a control loop.

A flow diagram depicting an embodiment of a method for executing a control loop by a power manager processor is illustrated in FIG. 4. In some embodiments, the embodiment of the method depicted in the flow diagram of FIG. 4 may correspond to the operation described in block 306 of the flow diagram illustrated in FIG. 3. Referring collectively to FIG. 2 and the flow diagram of FIG. 4, the method begins in block 401.

Data may then be received from a monitor circuit (block 402). In some embodiments, the data may be retrieved via an internal communication bus, such as, e.g., bus 105 as illustrated in FIG. 1, while, in other embodiments, the data may be retrieved from an off-chip location via an I/O interface, such as, I/O block 104 as illustrated in FIG. 1, for example. The data may, in other embodiments, be retrieved via a direct connection between processor core 201 and a given monitor circuit.

The received data may then be processed (block 403). In some embodiments, previously received data may be retrieved from memory 202, and a statistical analysis, such as, e.g., a running average, may be performed. A Proportional-Integral-Derivative (PID) loop, or other suitable analysis, may be performed in various embodiments. Results from the analysis of the retrieved data may, in various embodiments, be stored in memory 202 for later use or further analysis to determine trends and the like.

The method may depend on the value of the processed data (block 404). In some embodiments, the data may be compared to a predetermined threshold value. In other cases, a trend of multiple data points over a predetermined threshold value may trigger further action. The aforementioned threshold values may, in some embodiments, be adjustable or programmable depending on system configuration or other operating parameters.

If the processed data value is acceptable, the control loop may complete execution, and the method may conclude in block 406. Processor core 201 may then return to a low power state as described in more detail above in regard to FIG. 3. If the processed data value is not acceptable, e.g., the value is greater than a predetermined threshold value, the one or more performance settings may be adjusted (block 405). In some embodiments processor core 201 may send instructions to a power and clock management unit to change a voltage level of a power supply, and/or a frequency of a clock signal of a given functional unit within the computing system. Once the performance settings have been adjusted, the method may conclude in block 406 as described above.

Although the execution of a single control loop is depicted in embodiment illustrated in FIG. 4, in other embodiments, a power manager processor may execute any suitable number of control loops. In some embodiments, a separate control loop may retrieve data from numerous monitor circuits, and data received from each monitor circuit may be processed by a respective control loop. Multiple control loops, each responsible for retrieving and processing data from a respective monitor circuit, may be employed in other embodiments.

Figure 5:
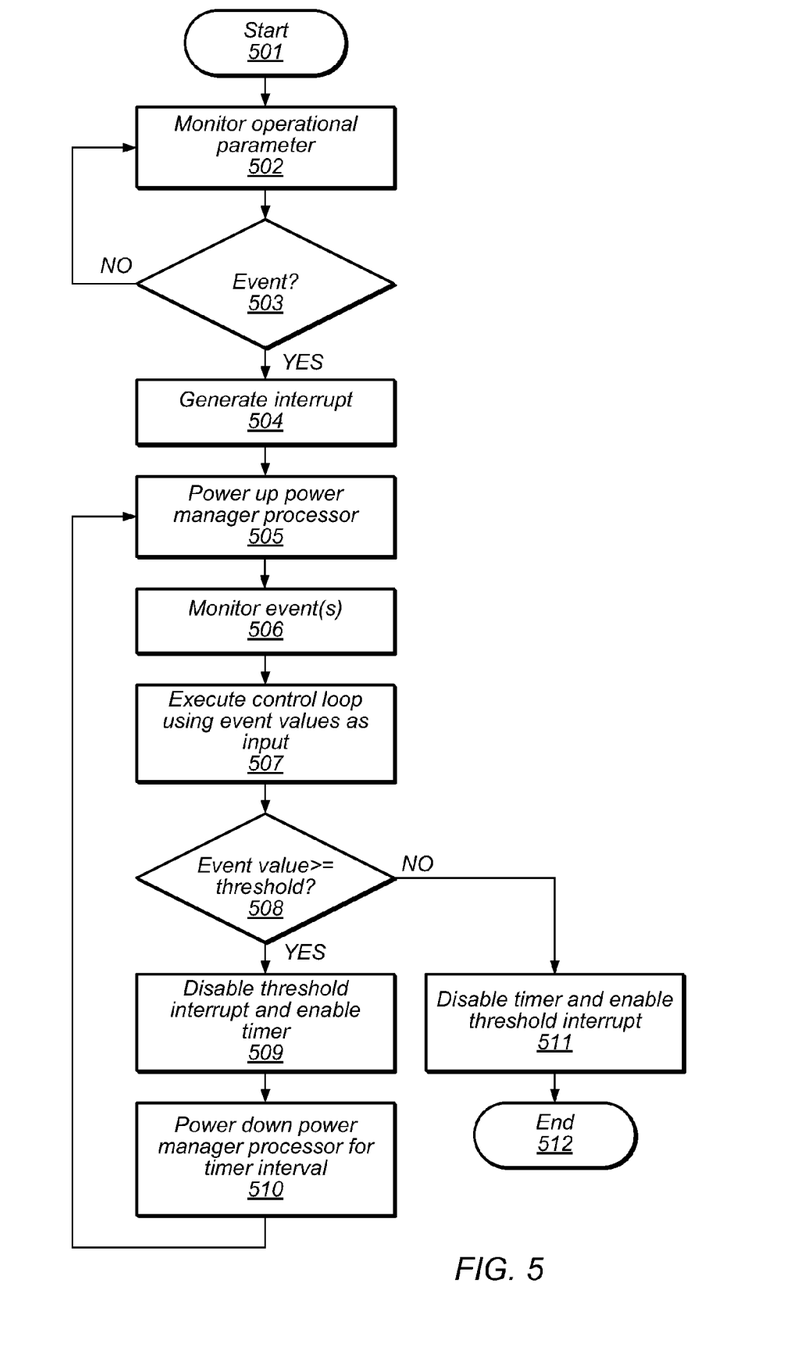
FIG. 5 illustrates a flow diagram depicting an embodiment of a method for disabling a threshold based interrupt.

Turning to FIG. 5, a flow diagram depicting an embodiment of a method for threshold based interrupts is illustrated. Referring collectively to FIG. 1 and the flow diagram of FIG. 5, the method begins in block 501.

Monitor circuit 107a may then monitor an operating parameter of memory unit 102 (block 502). In some embodiments, monitor circuit 107a may monitor a voltage level of a power supply, temperature, number of accesses to memory unit 102, or any other suitable metric. It is noted that although only a single monitor circuit is shown in FIG. 1, other embodiments may include multiple monitor circuit operating in parallel. Moreover, a functional unit may include multiple monitor circuits, each of which may be configured to monitor a different operating parameter within the functional unit. In some embodiments, multiple monitor circuits may be coupled to bus 105 to track different transactions or numbers of a specific transaction on bus 105.

The method may then depend on if an event occurs (block 503). Monitor circuit 107a may detect an event based on the monitoring of the operating parameter. For example, an event may, in some embodiments, include a change in temperature, operating voltage, or the like. Alternatively, the event may include a particular type of access to a functional unit, e.g., a write access, or when a number of accesses to the functional unit exceeds a predetermined threshold value. In some embodiments, the event may include an access to the functional unit from another specific functional unit within a computing system, such as, integrated circuit 100, for example.

When no event is detected, monitor circuit 107a continues to monitor the operating parameter as described above in regards to block 502. If an event is detected, then monitor circuit 107a may assert an interrupt (block 504). The interrupt may be sent to power manager processor 106 through bus 105 or any other suitable communication bus.

Power manager processor 106 may then exit from a low power state and return to an active mode (block 505). In some embodiments, upon detection of an interrupt, the active portion of power manager processor 106 may re-activate the inactive portions of power manager processor 106, thereby allowing the resumption of processing activities. The interrupt may, in some embodiments, be generated by a monitor circuit, such as, e.g., monitor circuit 107a, or by a timer included within power manager processor 206. In various embodiments, by employing a low power mode for power manager processor 106, the power consumed to monitor system performance and adjust performance settings may be minimized.

Once power manager processor 106 has exited the low power state, monitoring of one or more events may be performed (block 506). In various embodiments, power manager processor 106 may request telemetry from one or more monitor circuits. The monitor circuits may relay data acquired during a period of time during which power manager processor 106 was operating in the low power mode. In some embodiments, power manager processor 106 may receive the telemetry from monitor circuits located on different integrated circuits.

Power manager processor 106 may then execute a control loop (block 507) to adjust performance settings using event data as input. The control loop may be related to the event that trigger the interrupt, and may include one or more program instructions. Such program instructions may be stored in a memory dedicated to power manager processor 106, such as, e.g., memory 202 as illustrated in FIG. 2. Power manager processor 106 may retrieve the program instructions from the dedicated memory prior to execution.

The method may then depend on a value of the previously detected event (block 508). If the value of the event is greater than or equal to a threshold value, power manager processor 106 may disable further interrupts and enable one or more timer circuits (block 509). Each timer circuit may include one or more counters, and may be configured to detect a passage of a predetermined period of time. Once the timers have been enabled, power manager processor 106 may enter the low power mode for the predetermined period of time tracked by at least one of the timers (block 510). After the predetermined period of time has elapsed, the method may proceed as described above from block 505.

If the value of the previously detected event is less than another threshold value, power manager processor 106 may disable the timers and re-enable threshold interrupt operation (block 511). Once the timers have been disabled and threshold interrupt operation has been re-enabled, the method may conclude in block 512.

It is noted that the embodiment of the method illustrated in FIG. 5 is merely an example. In other embodiments, different operations and different orders of operation are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
one or more functional units, wherein at least one functional unit of the one or more functional units includes at least one monitor circuit, wherein the at least one monitor circuit is configured to:
monitor an operational parameter associated with a corresponding functional unit;
perform a comparison of a value of the operational parameter to a first threshold value;
generate an interrupt based on a result of the comparison; and
send data indicative of the operational parameter; and
a power manager processor coupled to a volatile memory, wherein the power manager processor is configured to:
in response to receiving the interrupt from the at least one monitor circuit:
exit a low power mode;
receive the data from the at least one monitor circuit;
perform a statistical analysis of the data to generate analysis results, wherein the statistical analysis includes calculating an average;
adjust one or more performance settings associated with the at least one functional unit in response to a determination that the analysis result is greater than a second threshold value; and
based on the results of the comparison, disable further interrupts and enable a timer circuit.

2. The system of claim 1, wherein the power manager processor is further configured to exit a low power mode responsive to receiving an interrupt generated by the at least one monitor circuit.

3. The system of claim 1, wherein to adjust the one or more performance settings, the power manager processor is further configured to execute one or more control loops, wherein each control loop includes a plurality of program instructions.

4. The system of claim 1, wherein to adjust the one or more performance settings, the power manager processor is further configured to adjust a frequency of a clock signal supplied to at least one functional unit of the one or more functional units.

5. The system of claim 1, wherein to adjust the one or more performance settings, the power manager processor is further configured to execute one or more control loops, wherein each control loop includes a plurality of program instructions, and wherein the plurality of program instructions are stored in the volatile memory.

6. A method, comprising:
monitoring an operational parameter of a computing system;
performing a comparison of a value of the operational parameter to a first threshold value;
generating, by a monitor circuit, an interrupt based on a result of the comparison;
sending data indicative of the operational parameter to a power manager processor of the computing system;
in response to receiving the interrupt from the monitor circuit:
exiting a low power mode;
receiving the data by the power manager processor from the monitor circuit;
performing a statistical analysis of the data, by the power manager processor, to generate analysis results, wherein the statistical analysis includes calculating an average;
adjusting, by the power manager processor, one or more performance settings in response to a determination that the analysis result is greater than a second threshold value; and
based on the results of the comparison, disabling further interrupts and enabling a timer circuit.

7. The method of claim 6, further comprising:
generating an interrupt in response to detecting an event; and
the power manager processor exiting a low power mode in response to the interrupt.

8. The method of claim 7, further comprising:
disabling the power manager processor exiting the low power mode in response to the interrupt responsive to determining that a value of the event is greater than or equal to a threshold value;
enabling at least one timer unit in response to the determining that the value of the event is greater than or equal to the threshold value; and
the power manager processor exiting the low power mode dependent upon a value of the at least one timer unit.

9. The method of claim 6, wherein adjusting the one or more performance settings comprises adjusting a frequency of a clock signal supplied to at least one functional unit included in the computing system.

10. The method of claim 6, wherein adjusting the one or more performance settings comprises adjusting a voltage level of a power supply of at least one functional unit included in the computing system.

11. The method of claim 6, wherein adjusting the one or more performance settings comprises the power manager processor executing one or more program instructions stored in volatile memory.

12. A non-transitory computer-accessible storage medium having programming instructions stored therein that, in response to execution by a computer system, causes the computer system to perform operations comprising:
monitoring an operational parameter of a computing system;
performing a comparison of a value of the operational parameter to a first threshold value;
generating, by a monitor circuit, an interrupt based on a result of the comparison; and
sending data indicative of the operational parameter to a power manager processor of the computing system;
in response to receiving the interrupt from the monitor circuit:
exiting a low power mode;
receiving the data by the power manager processor from the monitor circuit;

performing a statistical analysis of the data, by the power manager processor, to generate analysis results, wherein the statistical analysis includes calculating an average;

adjusting, by the power manager processor, one or more performance settings in response to a determination that the analysis result is greater than a threshold value; and based on the results of the comparison, disabling further interrupts and enabling a timer circuit.

13. The non-transitory computer-accessible storage medium of claim 12, wherein the operations further include:

generating an interrupt in response to detecting an event; and the power manager processor exiting a low power mode in response to the interrupt.

14. The non-transitory computer-accessible storage medium of claim 13, wherein the operations further include:

disabling the power manager processor exiting the low power mode responsive to the interrupt in response to determining that a value of the event is greater than or equal to a threshold value;

enabling at least one timer unit in response to the determining that the value of the event is greater than or equal to the threshold value; and the power manager processor exiting the low power mode dependent upon a value of the at least one timer unit.

15. The non-transitory computer-accessible storage medium of claim 12, wherein adjusting the one or more performance settings comprises adjusting a voltage level of a power supply of at least one functional unit included in the computing system.

16. The non-transitory computer-accessible storage medium of claim 12, wherein adjusting the one or more performance settings comprises adjusting a frequency of a clock signal supplied to at least one functional unit included in the computing system.

* * * * *